(12) United States Patent
Xiong et al.

(10) Patent No.: US 11,637,430 B2
(45) Date of Patent: Apr. 25, 2023

(54) POWER RECTIFICATION METHOD AND APPARATUS

(71) Applicant: HUAWEI TECHNOLOGIES CO., LTD., Guangdong (CN)

(72) Inventors: Liqun Xiong, Shenzhen (CN); Liangren Fang, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 104 days.

(21) Appl. No.: 17/390,766

(22) Filed: Jul. 30, 2021

(65) Prior Publication Data
US 2021/0359524 A1 Nov. 18, 2021

Related U.S. Application Data

(63) Continuation of application No. PCT/CN2020/072972, filed on Jan. 19, 2020.

(30) Foreign Application Priority Data

Jan. 30, 2019 (CN) .......................... 201910092038.9

(51) Int. Cl.
*H02J 3/32* (2006.01)
*H02M 1/00* (2006.01)
*H02J 3/48* (2006.01)
*H02M 1/04* (2006.01)
*H02M 7/02* (2006.01)

(52) U.S. Cl.
CPC .................................... *H02J 3/32* (2013.01); *H02J 3/48* (2013.01); *H02M 1/007* (2021.05); *H02M 1/045* (2013.01); *H02M 7/02* (2013.01)

(58) Field of Classification Search
CPC .......... H02J 3/32; H02M 1/007; H02M 1/045; H02M 7/02
See application file for complete search history.

(56) References Cited

U.S. PATENT DOCUMENTS

| | | | |
|---|---|---|---|
| 4,443,759 A | 4/1984 | Isaacson et al. | |
| 6,031,738 A * | 2/2000 | Lipo ..................... | H02M 7/487 363/43 |
| 2013/0188403 A1* | 7/2013 | Nielsen ............... | H02M 5/4585 363/37 |

FOREIGN PATENT DOCUMENTS

| CN | 201408996 Y | 2/2010 |
|---|---|---|
| CN | 102769385 A | 11/2012 |

(Continued)

*Primary Examiner* — Adolf D Berhane
*Assistant Examiner* — Afework S Demisse
(74) *Attorney, Agent, or Firm* — Huawei Technologies Co., Ltd.

(57) ABSTRACT

This application provides a power rectification method and apparatus, to supply power to a load by using a power supply capacity gap formed by a communications power that is at an existing network site, thereby achieving a capacity increase. The method includes: obtaining a total input current of each of three phase lines; and when it is determined that a total input current of at least one of the three phase lines is greater than a total input current threshold corresponding to the at least one phase line, adjusting a rectifier connected to the at least one phase line to reduce a total input power of the at least one phase line, so that the total input current of the at least one phase line is less than or equal to the total input current threshold corresponding to the at least one phase line.

20 Claims, 8 Drawing Sheets

(56) References Cited

FOREIGN PATENT DOCUMENTS

| | | |
|---|---|---|
| CN | 102868216 A | 1/2013 |
| CN | 103248231 A | 8/2013 |
| CN | 103986174 A | 8/2014 |
| CN | 104242322 A | 12/2014 |
| CN | 106100036 A | 11/2016 |
| CN | 106816883 A | 6/2017 |
| CN | 107086591 A | 8/2017 |
| CN | 108155818 A | 6/2018 |
| CN | 108281974 A | 7/2018 |
| CN | 108599154 A | 9/2018 |
| JP | 2014110730 A | 6/2014 |

\* cited by examiner

POWER RECTIFICATION METHOD AND APPARATUS

CROSS-REFERENCE TO RELATED APPLICATIONS

This application is a continuation of International Application No. PCT/CN2020/072972, filed on Jan. 19, 2020, which claims priority to Chinese Patent Application No. 201910092038.9, filed on Jan. 30, 2019. The disclosures of the aforementioned applications are hereby incorporated by reference in their entireties.

TECHNICAL FIELD

This application relates to the communications field, and more specifically, to a power rectification method and apparatus in the communications field.

BACKGROUND

At a communications site, when a communications power system is used to supply power to a communications device, there is a common phenomenon that a quantity of rectifiers connected to each of three phase lines is not equal. A rectifier in an existing communications power system uses a current sharing technology. That is, an input current and an output current of each rectifier are basically equal. When the quantity of rectifiers on each of the three phase lines is not equal, a current in loops of the three phase lines is unbalanced. The general circuit breaker may trip provided that a load current of a phase line exceeds a rated current of the general circuit breaker. In this case, if a load current of another phase line is far less than the rated current, a power supply capacity gap is formed. Consequently, utilization of an input capacity of a power supply system is greatly reduced.

SUMMARY

This application provides a power rectification method and apparatus, to supply power to a load by using a power supply capacity gap formed by a communications power that is at an existing network site, thereby achieving a capacity increase.

According to a first aspect, a power rectification method is provided. The method is applied to a first power consumption system, and the first power consumption system includes, for example, a newly-added communications device at an inventory communications site, or includes a communications device at a newly-built communications site. The method includes:

obtaining a total input current of each of three phase lines; and when it is determined that a total input current of at least one of the three phase lines is greater than a total input current threshold corresponding to the at least one phase line, adjusting a rectifier connected to the at least one phase line to reduce a total input power of the at least one phase line, so that the total input current of the at least one phase line is less than or equal to the total input current threshold corresponding to the at least one phase line.

Therefore, in an embodiment of this application, when a total input current of a phase line is greater than a total input current threshold corresponding to the phase line, a rectifier connected to the phase line is adjusted, so that an input current of the phase line is less than or equal to the total input current threshold corresponding to the at least one phase line. In this case, power output may still be performed on a phase line other than the phase line. Therefore, in this embodiment of this application, power can be supplied to a load by using a power supply capacity gap formed by a communications power that is at an existing network site, to achieve a capacity increase. Therefore, utilization of an input capacity of a power supply system provided in this embodiment of this application is relatively high.

In an optional embodiment, when a total input current of a phase line reaches a corresponding total input current threshold, a rectifier on the phase line stops outputting, to reduce a total input power of the phase line, so that the total input power of the phase line is less than or equal to the total input current threshold.

Optionally, in this embodiment of this application, the method further includes: setting a total input current threshold corresponding to each phase line.

With reference to the first aspect, in some implementations of the first aspect, the first power consumption system further includes a load and a first battery. The method further includes:

determining a remaining power supply power of each phase line based on the total input current of each phase line; and determining a working state of the first battery based on the remaining power supply power of each phase line and a load power of the load, where the working state of the first battery includes charging by using a current output by the rectifier, or discharging the load.

Specifically, a rectifier on each phase line may be independently adjusted based on the remaining power supply power of each phase line, to implement the working state of the first battery. Therefore, in this embodiment of this application, when a remaining capacity of the power supply system is sufficient, charging management is performed on a battery, and the remaining capacity of the power supply system is stored, to reduce a capacity gap of each phase line. When the remaining capacity of the power supply system is insufficient, discharging management is performed on the battery to release a stored capacity of a battery to compensate for a load requirement. Therefore, in this embodiment of this application, the battery can perform a function of peak clipping and capacity increasing, thereby relieving pressure on the power supply system that needs to be reconstructed due to an insufficient power supply capacity, and reducing reconstruction costs and time.

With reference to the first aspect, in some implementations of the first aspect, the determining a working state of the first battery based on the remaining power supply power of each phase line and a load power of the load includes:

if it is determined that the load power is less than or equal to a total remaining power supply power, charging the first battery at a first power, where the first power is less than or equal to a difference between the total remaining power supply power and the load power; or if it is determined that the load power is greater than a total remaining power supply power, discharging the first battery at a second power, where a sum of the second power and the total remaining power supply power is equal to the load power, where the total remaining power supply power is equal to a sum of remaining power supply powers of the three phase lines.

With reference to the first aspect, in some implementations of the first aspect, the determining a working state of the first battery based on the remaining power supply power of each phase line and a load power of the load includes:

if it is determined that the remaining power supply power of each of the three phase lines is greater than a third power, adjusting rectifiers on the three phase lines for a current sharing output, and charging the first battery at a real-time charging power of the first battery, where a value of the third power is one third of a sum of the load power and the real-time charging power; and if it is determined that remaining power supply powers of two of the three phase lines each are greater than a fourth power, and the power supply power of the remaining one phase line is less than the third power, enabling rectifiers on the two phase lines output a current in a current sharing mode, and charging the first battery at the real-time charging power of the first battery, where a value of the fourth power is half of the sum of the load power and the real-time charging power.

Optionally, a quantity of rectifiers connected to each phase line is equal.

Optionally, a relatively large quantity of rectifiers are connected to a phase line in the three phase lines that is with a relatively small current.

Optionally, in this embodiment of this application, after an alternating current power failure, if a value of a voltage provided by the first battery is less than a protection voltage of the first battery, a second battery in a second power consumption system is controlled to discharge for use by the load in the first power consumption system, where a general busbar in the second power consumption system is connected to a general busbar in the first power consumption system by using a direct current converter DC/DC, and the DC/DC isolates the first power consumption system from the second power consumption system during the alternating current power supply.

Therefore, in this embodiment of this application, superposition of the second battery can be implemented. Specifically, when mains power is available, the DC/DC module is controlled to isolate the second battery, to protect an inventory battery. After a mains power failure occurs, the DC/DC module may be controlled to integrate the second battery to provide backup power for a newly-added load, thereby reducing a capacity requirement of the first battery and investment costs.

According to a second aspect, a power rectification apparatus is provided. The apparatus is configured to perform the method according to any one of the first aspect or the possible implementations of the first aspect. Specifically, the apparatus may include a module configured to perform the method according to any one of the first aspect or the possible implementations of the first aspect.

According to a third aspect, a power rectification apparatus is provided. The apparatus includes a memory and a processor. The memory is configured to store instructions, and the processor is configured to execute the instructions stored in the memory. In addition, execution of the instructions stored in the memory enables the processor to perform the method according to any one of the first aspect or the possible implementations of the first aspect.

According to a fourth aspect, a computer-readable storage medium is provided. The computer-readable storage medium stores instructions, and when the instructions are run on a computer, the computer is enabled to perform the method according to any one of the first aspect or the possible implementations of the first aspect.

According to a fifth aspect, a computer program product including instructions is provided. When the computer program product runs on a computer, the computer is enabled to perform the method according to any one of the first aspect or the possible implementations of the first aspect.

DESCRIPTION OF EMBODIMENTS

The following describes technical solutions of this application with reference to the accompanying drawings.

Figure 1:
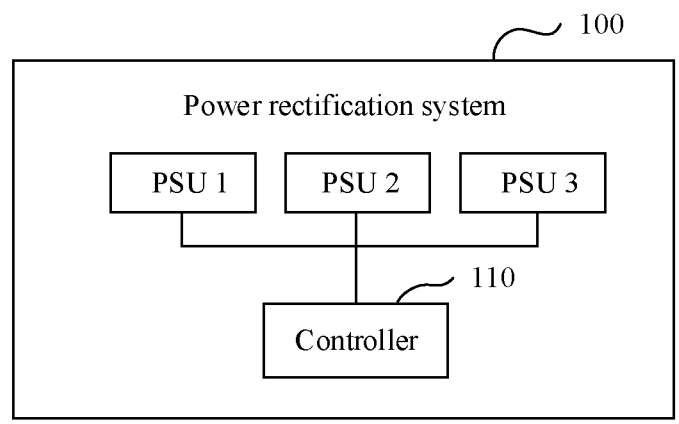
FIG. 1 is a schematic diagram of a power rectification system according to an embodiment of this application.

FIG. 1 is a schematic diagram of a power rectification system 100 according to an embodiment of this application. The power rectification system 100 may be applied to a communications site in the communications field, or applied to a field of civil devices such as a street lamp system, a property service building, and a car charging station, to perform adaptation and adjustment on a voltage/current output by mains during power supply. In this embodiment of this application, an "input" of the mains during power supply is a three-phase alternating current power, which is referred to as a three-phase power, including three phase lines. In this embodiment of this application, the power rectification system may also be referred to as a power dynamic capacity increase system or another name. This is not limited in this embodiment of this application. In addition, in this embodiment of this application, a rectifier may also be referred to as a power supply unit (power supply unit, PSU).

In this embodiment of this application, the power rectification system 100 may include a controller 110 and at least two rectifiers (for example, a PSU 1, a PSU 2, and a PSU 3 shown in FIG. 1). The controller 110 is configured to: obtain a total input current of each of three phase lines, and when it is determined that a total input current of at least one of the three phase lines is greater than a total input current threshold corresponding to the phase line, adjust a rectifier connected to the at least one phase line to reduce a total input power of the at least one phase line, so that the total input current of the at least one phase line is less than or equal to the total input current threshold corresponding to the at least one phase line.

Figure 2:
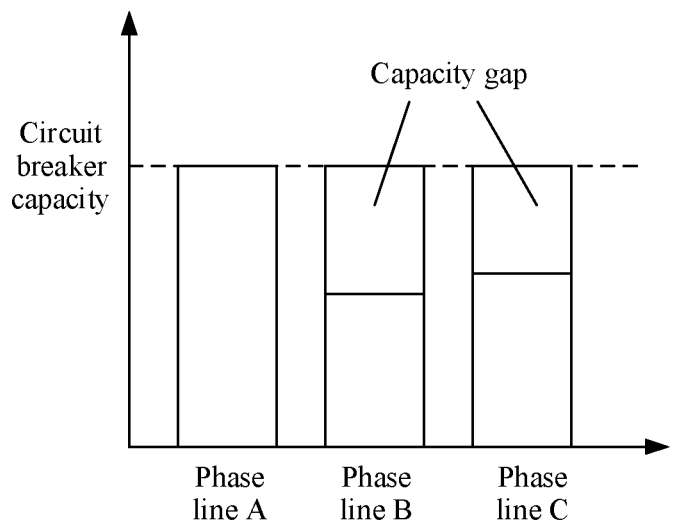
FIG. 2 is a schematic diagram of a power supply capacity in the current technology.

However, in the current technology, a current sharing technology is used, and independent adjustment cannot be performed based on a load current of each phase line. If a quantity of rectifiers (PSUs) connected to each of the three phase lines is not equal, or if some rectifiers are faulty during operation, a current of the three phase lines is unbalanced. When a load current of one of the three phase lines is greater than a rated current of a general circuit breaker, the general circuit breaker may trip. In this case, a load current of another phase line may not reach the rated current. As a result, a power supply capacity gap is formed and utilization of power supply capacity is reduced. As shown in FIG. 2, when a load current of a phase line A in three phase lines reaches a general circuit breaker capacity (namely, a rated current of the general circuit breaker), a load current of each of a phase line B and a phase line C does not reach the general circuit breaker capacity. If the circuit breaker trips, a capacity gap of the phase line B is a difference between the circuit breaker capacity and a load power capacity of the phase line B, and a capacity gap of the phase line C is a difference between the circuit breaker capacity and a load power capacity of the phase line C. The capacity gap reduces utilization of an input capacity of a system.

Therefore, in this embodiment of this application, when a total input current of a phase line is greater than a total input current threshold corresponding to the phase line, a rectifier connected to the phase line is adjusted, so that an input current of the phase line is less than or equal to the total input current threshold corresponding to the at least one phase line. In this case, power output may still be performed on a phase line other than the phase line. Therefore, in this embodiment of this application, power can be supplied to a load by using a power supply capacity gap formed by a communications power that is at an existing network site, to achieve a capacity increase. Therefore, utilization of an input capacity of a power supply system provided in this embodiment of this application is relatively high.

In an implementation, the controller 110 may detect a current of each phase line by connecting a current sensor. The current sensor is configured to: detect a total alternating current input current of each phase line in real time and transmit data to the controller 110. The controller 110 is, for example, a central processing unit CPU in a system, and may be configured to: collect and analyze system data, and adjust an input power of a rectifier.

The rectifier is a unit that converts an alternating current into a direct current that can be used by a device, such as a communications device. In addition, the controller 110 may independently and dynamically adjust a rectifier on each phase line, to determine that a total input current of each phase line is less than or equal to a total input current threshold corresponding to the phase line. In this way, the use of an input capacity of each phase line in a power supply system is maximized, to achieve a dynamic capacity increase. In some possible implementations, the controller 110 may adjust a quantity of rectifiers connected to each phase line, and/or adjust an output current of a rectifier connected to each phase line, to dynamically adjust the rectifier on each phase line. This is not limited in this embodiment of this application. In a specific embodiment, when a load current of a phase line reaches an upper power supply limit, a rectifier on the phase line may be used to stop outputting a current, so that a total input current of the phase line is equal to a total input current threshold.

The following describes the power rectification system 100 provided in this embodiment of this application by using an example in which the power rectification system 100 is applied to the communications site in the communications field. Hereinafter, the power rectification system 100 is referred to as a power dynamic capacity increase system 100.

Specifically, the power dynamic capacity increase system 100 may be used as a multi-purpose direct current power supply system to supply power to a communications device at the communications site. Herein, the communications device may be referred to as a load. For example, the load may be a 2G, 3G, 4G, or 5G communications device, or a possible future communications device. This is not limited in this embodiment of this application. Optionally, there may further be a battery at the communications site. For example, the battery may be an energy storage lithium battery (which may also be referred to as an energy storage lithium battery), or another battery. This is not limited in this embodiment of this application.

In this embodiment of this application, the battery is configured to store electric energy. In an implementation, the battery may be provided with a battery management system (battery management system, BMS), and the BMS may be managed by the controller 110. When a remaining capacity of the power supply system is sufficient, charging management is performed on the battery, and the remaining capacity of the power supply system is stored, to reduce a capacity gap of each phase line. When the remaining capacity of the power supply system is insufficient, the BMS performs battery discharging management to release a stored capacity of the battery to compensate for a load requirement. Therefore, in this embodiment of this application, the battery can perform a function of peak clipping and capacity increasing, thereby relieving pressure on the power supply system that needs to be reconstructed due to an insufficient power supply capacity, and reducing reconstruction costs and time.

Figure 3:
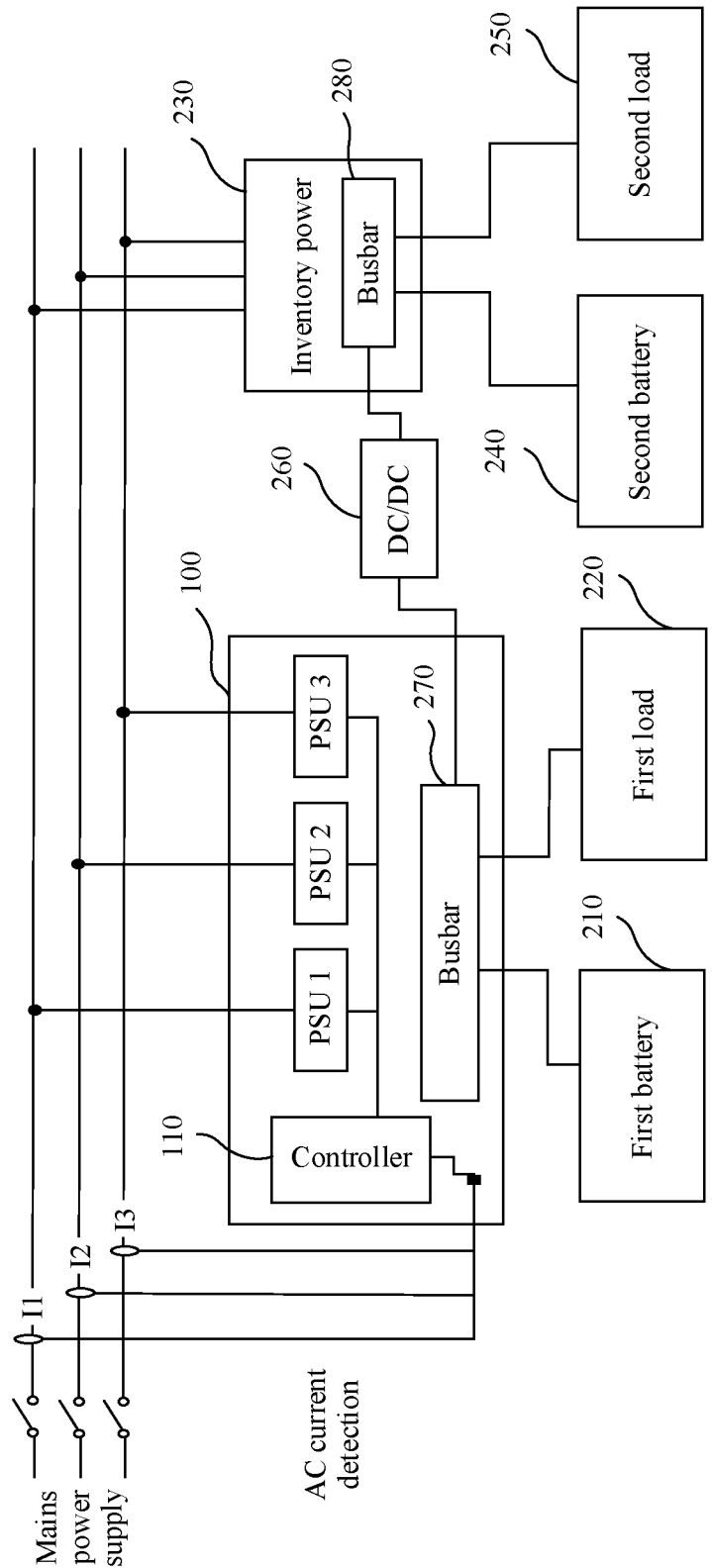
FIG. 3 shows an example of a scenario to which a voltage rectification method according to an embodiment of this application is applied.

In an optional embodiment, as shown in FIG. 3, a communications device may be newly added to an inventory communications site, and the power dynamic capacity increase system 100 may be configured to supply power to the newly-added communications device. The power dynamic capacity increase system 100 can resolve a problem of an insufficient capacity of an existing power supply system, and reduce reconstruction of a transformer, a circuit breaker, and a cable that are at a mains input end. For the controller 110, refer to the description in FIG. 1. In this embodiment of this application, the newly-added communications device at the inventory communications site may be referred to as a first power consumption system, and an existing communications device at the inventory communications site may be referred to as a second power consumption system.

In this embodiment of this application, the first power consumption system includes a newly-added load, for example, a first load 220 shown in FIG. 2. Optionally, the first power consumption system may further include a first battery 210. For example, the first battery 210 may be an energy storage lithium battery. For example, the first battery 210 and the first load 220 may be connected to a general busbar 270 in the power dynamic capacity increase system 100. As shown in FIG. 2, for example, at the inventory communications site, there may be an inventory power 230, a second battery 240 (which may also be referred to as an inventory battery), and a second load 250 (which may also be referred to as an inventory load). The second battery 240 and the second load 250 may be connected to a general busbar 280 in the inventory power 230.

In addition, the general busbar 270 in the power dynamic capacity increase system 100 and the general busbar 280 in the inventory power 230 may be connected by using a direct current converter (direct current to direct current, DC/DC) 260. The DC/DC module is used as a control module for a connection between the power dynamic capacity increase system and the second battery, and may implement isolation and integration of the second battery under control of the controller 110, and support the second battery to dynamically adjust an output voltage based on a load requirement.

Therefore, in this embodiment of this application, superposition of the power dynamic capacity increase system 100 and the second battery 240 can be implemented by using the DC/DC module. Specifically, when mains power is available, the DC/DC module 260 is controlled to isolate the second battery, to protect the inventory battery. After a mains power failure occurs, the DC/DC module 260 may be controlled to integrate the second battery to provide backup power for the newly-added load, thereby reducing a capacity requirement of the first battery and investment costs.

In another optional embodiment, the power dynamic capacity increase system may alternatively be used in a newly-built communications site, and used as a direct current power supply power of a communications device at the site. In this way, utilization of an input capacity of an alternating current can be improved, and a greater scalability can be supported. Specifically, for the application to the newly-built communications site, refer to the description of a newly-added communications site in FIG. 2. To avoid repetition, details are not described herein again.

In a possible implementation of this embodiment of this application, a quantity of rectifiers PSU in the power dynamic capacity increase system 100 is an integer multiple of 3, and the rectifiers are equally allocated and fixed on three phase lines.

Figure 4:
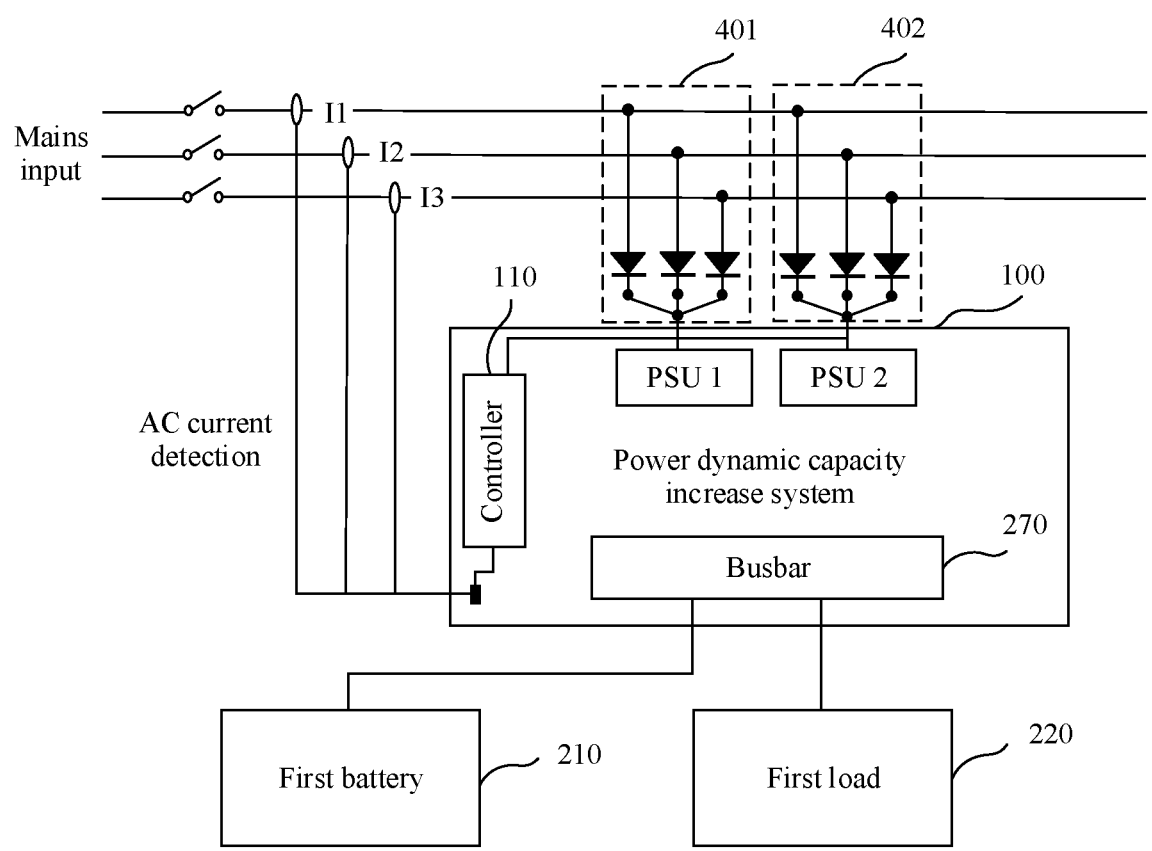
FIG. 4 shows another example of a scenario to which a voltage rectification method according to an embodiment of this application is applied.

In another possible implementation of this embodiment of this application, there may be any quantity of rectifiers in the power dynamic capacity increase system 100, and the quantity may not necessarily be an integer multiple of 3. In this implementation, each rectifier may be connected to the three phase lines through three interlocking two-phase thyristors. As shown in FIG. 4, the power dynamic capacity increase system 100 includes two PSUs: a PSU 1 and a PSU 2. The PSU 1 may be separately connected to three phase lines through three interlocking two-phase thyristors (as shown in 401), and the PSU 2 may be separately connected to the three phase lines through three interlocking two-phase thyristors (as shown in 402). The controller 110 may be configured to control one PSU to be connected to only one phase line at a time. For example, the controller 110 may allow, by control, continuity of only one of the three two-phase thyristors during a same period of time, and the other two two-phase thyristors are turned off, to avoid a short circuit between every two-phase lines. The same reference numerals in FIG. 4 and FIG. 2 indicate same meanings.

Figure 5A:
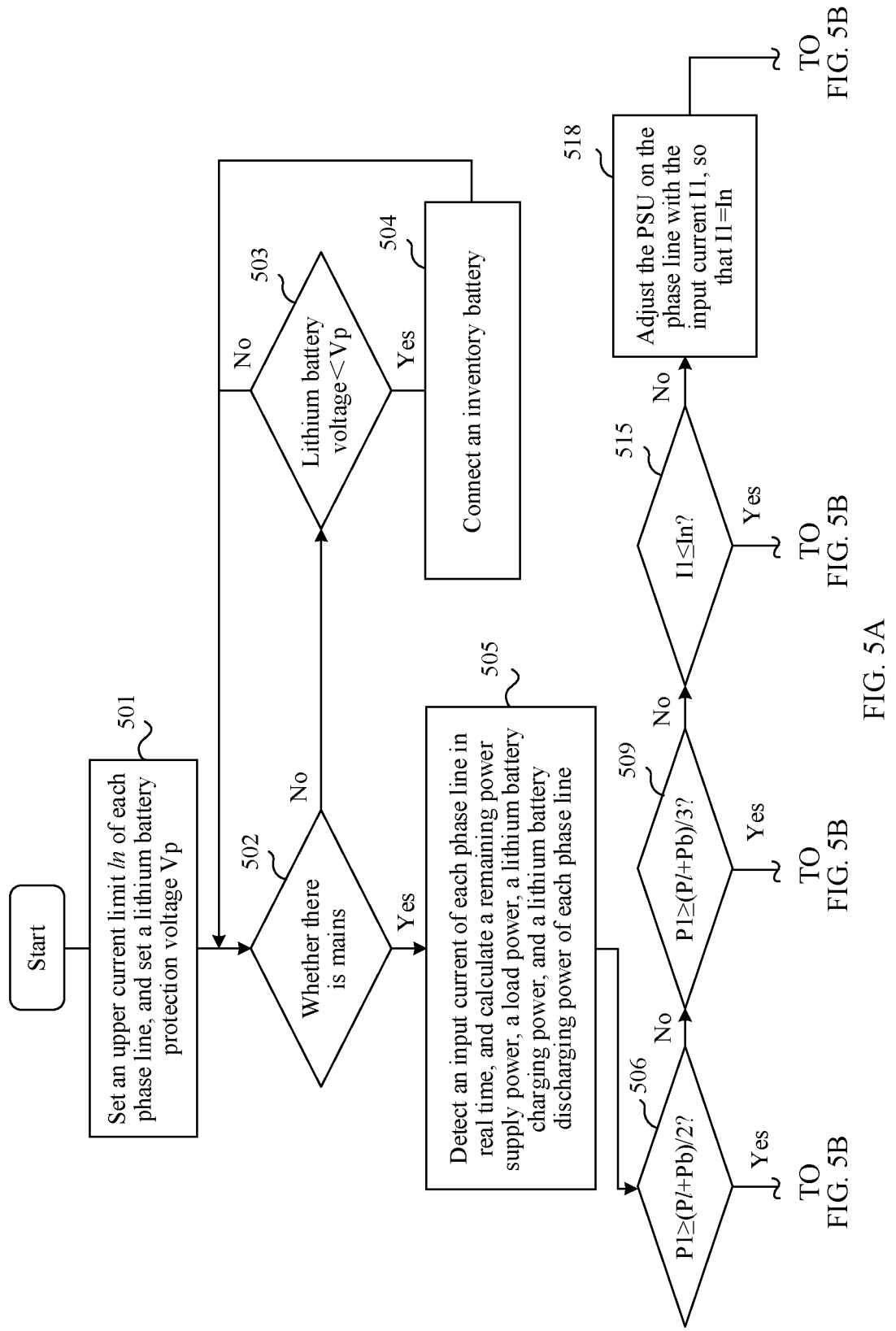
FIG. 5A and FIG. 5B are a schematic flowchart of a current adjustment method according to an embodiment of this application.
Figure 5B:
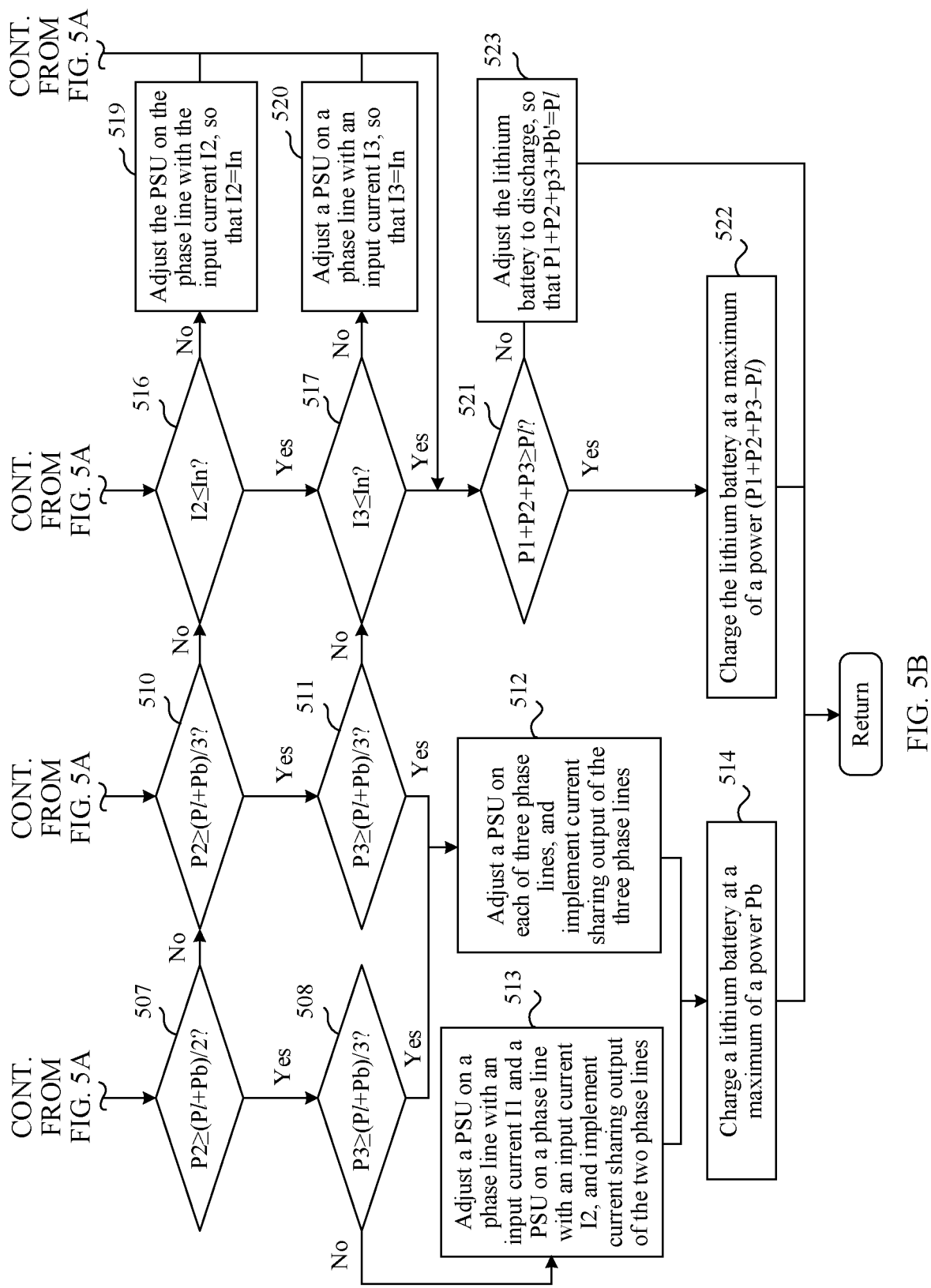

FIG. 5A and FIG. 5B are a schematic flowchart of a current adjustment method according to an embodiment of this application. The method may be performed by the controller 110 in the power dynamic capacity increase system 100 shown above. It should be understood that FIG. 5A and FIG. 5B show steps or operations of the current adjustment method, but these steps or operations are merely examples. In this embodiment of this application, other operations or variations of the operations in FIG. 5A and FIG. 5B may be further performed. In addition, the steps in FIG. 5A and FIG. 5B may be performed in an order different from that presented in FIG. 5A and FIG. 5B, and it is possible that not all operations in FIG. 5A and FIG. 5B need to be performed.

501: Set an upper current limit In of each phase line, and set a lithium battery protection voltage Vp.

Specifically, a first power consumption system may include the power dynamic capacity increase system 100, and the controller 110 in the power dynamic capacity increase system 100 sets the upper current limit In of each phase line. The upper current limit In is a total input current threshold corresponding to each phase line. In an implementation, three poles of a general circuit breaker connected to three phase lines are linked. In this case, the three phase lines correspond to a same total input current threshold. Alternatively, in another implementation, the three phase lines may correspond to different total input current thresholds. This is not limited in this embodiment of this application. In this embodiment of this application, the total input current threshold may also be referred to as a current threshold or an upper current limit.

In this embodiment of this application, an example in which a battery in the first power consumption system is an energy storage lithium battery is used for description. In addition, the energy storage lithium battery herein may also be referred to as a lithium battery. The lithium battery protection voltage Vp is a protection voltage for stopping discharging when a lithium battery level is too low. In other words, when a lithium battery output voltage is lower than Vp, the lithium battery stops discharging.

502: Determine whether there is mains.

When a mains power failure occurs, step 503 is performed next. When mains power is available, step 505 is performed next. Herein, the mains is alternating current power supply.

503: Determine whether a lithium battery voltage is lower than the lithium battery protection voltage Vp.

When the lithium battery voltage is higher than or equal to the lithium battery protection voltage, the lithium battery is used to supply power to a communications site. When the lithium battery voltage is lower than the lithium battery protection voltage Vp, step 504 is performed next.

504: Connect an inventory battery.

Specifically, a second power consumption system includes the inventory battery. When mains power is available, or when the lithium battery voltage is higher than or equal to the lithium battery protection voltage Vp, the controller may control a DC/DC module to isolate the inventory battery from the communications site, to protect the inventory battery. When the mains power failure occurs, and the lithium battery voltage is lower than the lithium battery protection voltage Vp, the controller may control the DC/DC module to integrate the inventory battery into the communications site, to use the inventory battery to provide backup power for a power consumption device at the communications site, thereby reducing a capacity requirement of the lithium battery and investment costs.

It should be noted that in this embodiment of this application, a newly-added communications device at an inventory communications site may be used as an example of the first power consumption system, and an existing communications device at the inventory communications site may be used as an example of the second power consumption system. Specifically, for the first power consumption system and the second power consumption system, refer to the foregoing descriptions. To avoid repetition, details are not described herein again.

505: Detect an input current of each phase line in real time, and calculate a remaining power supply power, a load power, a lithium battery charging power, and a lithium battery discharging power of each phase line.

Specifically, the controller may detect the input current of each phase line in real time by using a current sensor. In this embodiment of this application, the input current of each phase line is a total input current of each phase line. Herein, input currents of the three phase lines may be denoted as I1, I2, and I3 respectively.

Then, a processing unit in the controller may calculate the remaining power supply power of each phase line based on an obtained input current of each phase line. The remaining power supply power of each phase line is a difference between an output power corresponding to the phase line when an upper input current limit In is reached and an output power corresponding to a currently-input current. Herein, remaining power supply powers of the three phase lines may be denoted as P1, P2, and P3 respectively. A remaining power supply power corresponding to a phase line with the input current I1 is P1, and the phase line may be referred to as a first phase line. A remaining power supply power corresponding to a phase line with the input current I2 is P2, and the phase line may be referred to as a second phase line. A remaining power supply power corresponding to a phase line with the input current I3 is P3, and the phase line may be referred to as a third phase line.

The controller may further obtain a current load power Pl.

Herein, the controller is further configured to determine a working state of the lithium battery based on the remaining power supply power and the load power of each phase line. The working state includes charging based on an output current by using a rectifier, or discharging the load. A charging power may be denoted as Pb, and a discharging power may be denoted as Pb'.

506: Determine whether the remaining power supply power P1 is greater than or equal to (Pl+Pb)/2, that is, (P1≥(Pl+Pb)/2).

When it is determined that the remaining power supply power P1 is greater than or equal to (Pl+Pb)/2, step 507 is performed. When it is determined that the remaining power supply power P1 is less than (Pl+Pb)/2, step 509 is performed.

507: Determine whether the remaining power supply power P2 is greater than or equal to (Pl+Pb)/2, that is, (P2≥(Pl+Pb)/2).

When it is determined that the remaining power supply power P2 is greater than or equal to (Pl+Pb)/2, step 508 is performed. When it is determined that the remaining power supply power P2 is less than (Pl+Pb)/2, step 510 is performed.

508: Determine whether the remaining power supply power P3 is greater than or equal to (Pl+Pb)/3, that is, (P3≥(Pl+Pb)/3).

When it is determined that the remaining power supply power P3 is greater than or equal to (Pl+Pb)/3, step 512 is performed. When it is determined that the remaining power supply power P3 is less than (Pl+Pb)/3, step 513 is performed.

509: Determine whether the remaining power supply power P1 is greater than or equal to (Pl+Pb)/3, that is, (P1≥(Pl+Pb)/3).

Step 509 is performed after step 506. Specifically, when it is determined that the remaining power supply power P1 is less than (Pl+Pb)/2, it needs to be further determined whether the remaining power supply power P1 is greater than or equal to (Pl+Pb)/3. If it is determined that the remaining power supply power P1 is greater than or equal to (Pl+Pb)/3, step 510 is performed. If it is determined that the remaining power supply power P1 is less than (Pl+Pb)/3, step 515 is performed.

510: Determine whether the remaining power supply power P2 is greater than or equal to (Pl+Pb)/3, that is, (P2≥(Pl+Pb)/2).

After step 509 is performed, when P1 is greater than or equal to (Pl+Pb)/3, step 510 is performed. Alternatively, after step 507 is performed, when P2 is less than (Pl+Pb)/2, step 510 is performed.

If it is determined that the remaining power supply power P2 is greater than or equal to (Pl+Pb)/3, step 511 is performed. If it is determined that the remaining power supply power P2 is less than (Pl+Pb)/3, step 516 is performed.

511: Determine whether the remaining power supply power P3 is greater than or equal to (Pl+Pb)/3, that is, (P3≥(Pl+Pb)/3).

After step 510 is performed, when P2 is greater than or equal to (Pl+Pb)/3, step 511 is performed.

When it is determined that the remaining power supply power P3 is greater than or equal to (Pl+Pb)/3, step 512 is performed. When it is determined that the remaining power supply power P3 is less than (Pl+Pb)/3, step 517 is performed.

512: Adjust a rectifier (PSU) on each of the three phase lines, and implement current sharing output of the three phase lines.

Figure 6:
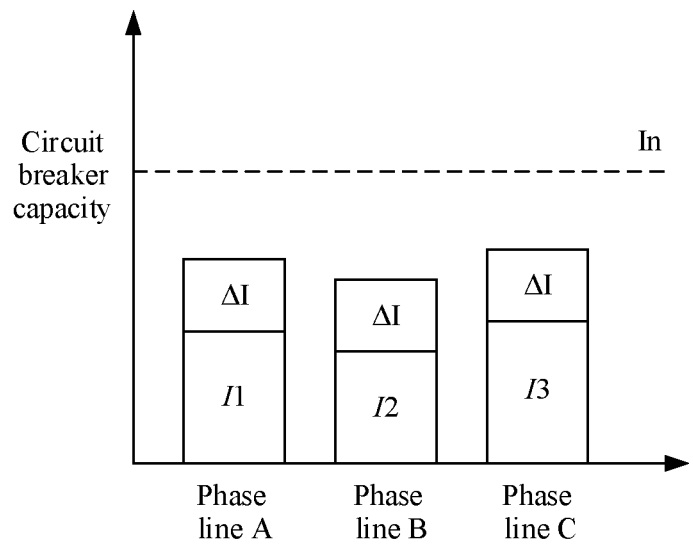
FIG. 6 is a schematic diagram of a power supply capacity according to an embodiment of this application.

Specifically, when step 512 of the power rectification method is performed, it indicates that the remaining power supply powers Pi of the three phase lines each are greater than or equal to (Pl+Pb)/3, that is, Pi≥(Pl+Pb)/3, and i=1, 2, or 3. In other words, when the remaining power supply powers of the three phase lines are sufficient and a condition of current sharing of the three phase lines is met, the rectifier may operate in a current sharing mode. That is, currents output by rectifiers on the phase lines remain equal. FIG. 6 shows an example of an output current AI from the rectifier on each phase line. As shown in FIG. 6, in this case, a phase line A (corresponding to the first phase line) load, a phase line B (corresponding to the second phase line) load, and a phase line C (corresponding to the third phase line) load each do not reach a circuit breaker capacity (a corresponding input current is the input current threshold In). In this case, power supply to the load and charging of the energy storage lithium battery can be simultaneously satisfied.

513: Adjust a PSU on a phase line with the input current I1 and a PSU on a phase line with the input current I2, and implement current sharing output of the two phase lines.

Figure 7:
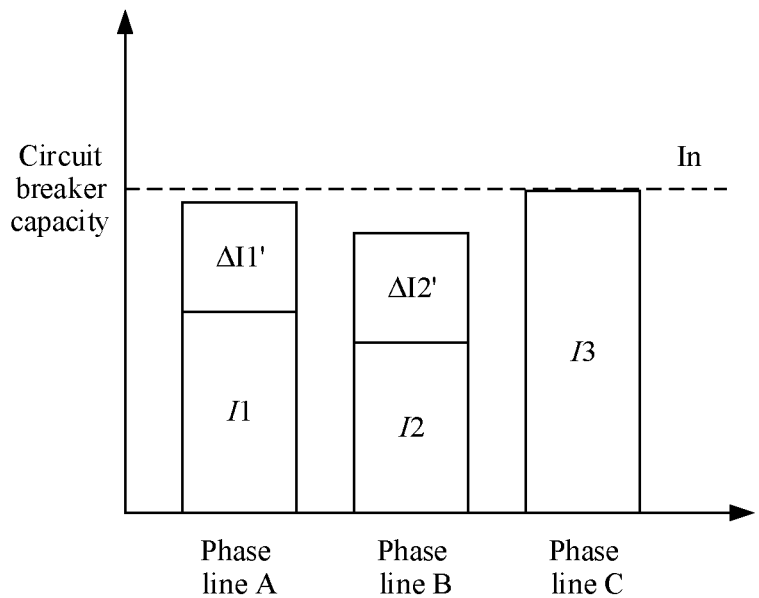
FIG. 7 is a schematic diagram of another power supply capacity according to an embodiment of this application.

Specifically, when step 513 of the power rectification method is performed, it indicates that the remaining power supply powers Pi of the first phase line and the second phase line each are greater than or equal to (Pl+Pb)/2, that is, Pi≥(Pl+Pb)/2, and i=1 or 2. The remaining power supply power P3 of the third phase line is insufficient. In other words, P3 is less than (Pl+Pb)/3, that is, P3<(Pl+Pb)/3. In this case, the controller turns off a rectifier connected to a phase line (for example, the third phase line) with an insufficient remaining power supply power, and retains rectifiers on the other two phase lines for a current sharing output. FIG. 7 shows an example in which currents output by rectifiers on two phase lines are equal. As shown in FIG. 7, the phase line C (corresponding to the third phase line) load reaches the circuit breaker capacity (a corresponding input current is the input current threshold In). Rectifiers on the phase line A (corresponding to the first phase line) and the phase line B (corresponding to the second phase line)

operate in the current sharing mode, that is, ΔI1'=ΔI2'. In this case, power supply to the load and charging of the energy storage lithium battery can be simultaneously satisfied.

In some possible implementations, when a quantity of rectifiers PSU is an integer multiple of 3, and the rectifiers are equally allocated and fixed on the three phase lines, in FIG. 6, the rectifier on each phase line outputs a current in the current sharing mode. In FIG. 7, a rectifier on each of the first phase line and the second phase line outputs a current in the current sharing mode, and a rectifier on the third phase line is turned off.

Step 514 is performed after step 512 or step 513.

514: Charge the lithium battery at a maximum of a power Pb.

In this case, circuits output by the rectifiers on the three phase lines can simultaneously satisfy power supply to the load and charging of the energy storage lithium battery.

Correspondingly, the lithium battery may be charged at the maximum of the power Pb. Herein, Pb is a real-time charging power of the lithium battery, and the real-time charging power varies according to a rated capacity of the battery and a current remaining power storage.

515: Determine whether the input current I1 is less than or equal to the upper current limit In, that is, (I1≤In).

Step 515 is performed after step 509. To be specific, after it is determined that the remaining power supply power P1 is less than (Pl+Pb)/2 and less than (Pl+Pb)/3, it needs to be further determined whether the input current I1 is less than or equal to the upper current limit In.

When it is determined that I1 is less than or equal to In, step 516 is performed. When it is determined that I1 is greater than In, step 518 is performed.

516: Determine whether the input current I2 is less than or equal to the upper current limit In, that is, (I2≤In).

After step 510 is performed, when P2 is less than (Pl+Pb)/3, step 516 is performed. Alternatively, after step 515 is performed, when I1 is less than or equal to In, step 516 is performed.

When it is determined that I2 is less than or equal to In, step 517 is performed. When it is determined that I2 is greater than In, step 519 is performed.

517: Determine whether the input current I3 is less than or equal to the upper current limit In, that is, (I3≤In).

After step 516 is performed, when I2 is less than or equal to In, step 517 is performed. Alternatively, after step 511 is performed, when P3 is less than (Pl+Pb)/3, step 517 is performed.

When it is determined that I3 is less than or equal to In, step 521 is performed. When it is determined that I3 is greater than In, step 520 is performed.

518: Adjust the PSU on the phase line with the input current I1, so that I1=In.

Specifically, when it is determined that I1 is greater than In, the controller controls the input current I1 of the first phase line by controlling a rectifier connected to the first phase line, so that I1 is equal to In.

519: Adjust the PSU on the phase line with the input current I2, so that I2=In.

Specifically, when it is determined that I2 is greater than In, the controller controls the input current I2 of the second phase line by controlling a rectifier connected to the second phase line, so that I2 is equal to In.

520: Adjust a PSU on a phase line with the input current I3, so that I3=In.

Specifically, when it is determined that I3 is greater than In, the controller controls the input current I3 of the third phase line by controlling a rectifier connected to the third phase line, so that I3 is equal to In.

In conclusion, when it is detected that the remaining power supply powers of the three phase lines each are less than (Pl+Pb)/2, and the remaining power supply power of at least one phase line is less than (Pl+Pb)/3, the controller adjusts the rectifier to perform differential current limiting adjustment. That is, the input current of each phase line is controlled to be less than or equal to the input current threshold In. Herein, a current output by the rectifier may be adjusted to control an input current of a corresponding phase line.

After step 517, step 518, step 519, or step 520 are performed, when I1, I2, and I3 each are less than or equal to In, step 521 is performed.

521: Determine whether a total remaining power supply power of the three phase lines is greater than or equal to the load power Pl, that is, P1+P2+P3≥Pl.

When it is determined that P1+P2+P3 is greater than or equal to Pl, step 522 is performed. When it is determined that P1+P2+P3 is less than Pl, step 523 is performed.

522: Charge the lithium battery at a maximum of a power (P1+P2+P3−Pl).

To be specific, when the total remaining power supply power of the three phase lines is greater than or equal to Pl, the lithium battery is charged at the maximum of the power (P1+P2+P3−Pl). In other words, on a premise that the power dynamic capacity increase system preferentially satisfies power supply to the load, a remaining power is used to charge the energy storage lithium battery.

Therefore, in this embodiment of this application, when a remaining capacity of a power supply system is sufficient, the lithium battery may be charged, and the remaining capacity of the power supply system is stored, to reduce a capacity gap of each phase line.

523: Adjust the lithium battery to discharge according to a power Pb', so that P1+P2+p3+Pb'=Pl.

To be specific, when the total remaining power supply power of the three phase lines is less than Pl, the lithium battery discharges at a maximum of the power Pb', so that P1+P2+p3+Pb'=Pl. In other words, in this case, the controller may adjust discharging of the energy storage lithium battery to compensate for a power requirement of the load.

Therefore, in this embodiment of this application, when a capacity of the power supply system is insufficient, a stored capacity of the battery may be released to compensate for a load requirement.

Therefore, in this embodiment of this application, when an input current of a phase line is greater than an input current threshold corresponding to the phase line, a rectifier connected to the phase line is adjusted, so that the input current of the phase line is less than or equal to the input current threshold corresponding to the phase line. Therefore, in this embodiment of this application, power can be supplied to a load by using a power supply capacity gap formed by a communications power that is at an existing network site, to achieve a capacity increase. In addition, in this embodiment of this application, the battery can perform a function of peak clipping and capacity increasing, thereby relieving pressure on the power supply system that needs to be reconstructed due to an insufficient power supply capacity, and reducing reconstruction costs and time.

Figure 8:
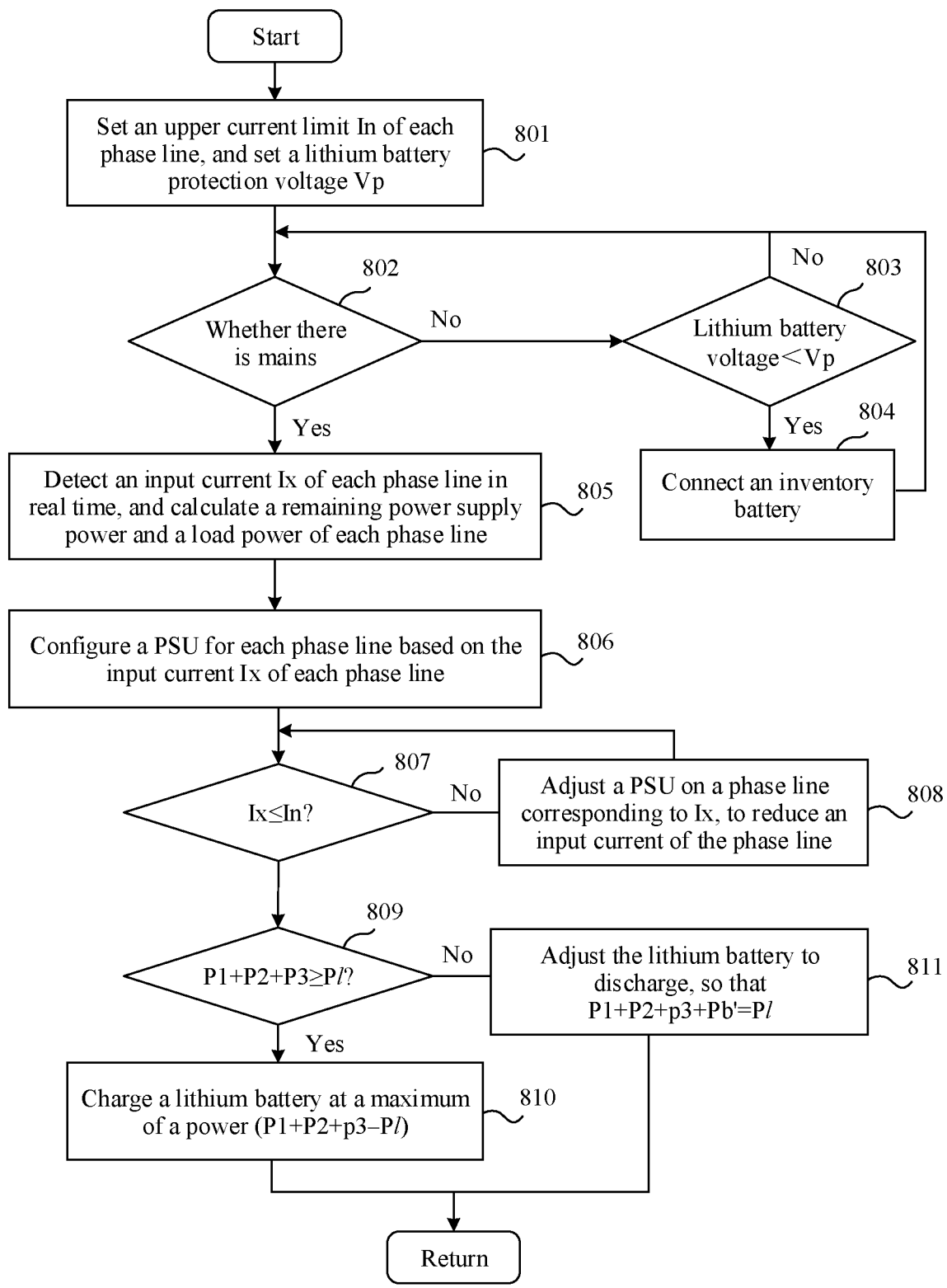
FIG. 8 is a schematic flowchart of another current adjustment method according to an embodiment of this application.

FIG. 8 is a schematic flowchart of another current adjustment method according to an embodiment of this application. The method may be performed by the controller 110 in the power dynamic capacity increase system 100 shown above. It should be understood that FIG. 8 shows steps or operations of the current adjustment method, but these steps or operations are merely examples. In this embodiment of this application, other operations or variations of the operations in FIG. 8 may be further performed. In addition, the steps in FIG. 8 may be performed in an order different from that presented in FIG. 8, and it is possible that not all operations in FIG. 8 need to be performed.

801: Set an upper current limit In of each phase line, and set a lithium battery protection voltage Vp.

802: Determine whether there is mains.

803: Determine whether a lithium battery voltage is lower than the lithium battery protection voltage Vp.

804: Connect an inventory battery.

805: Detect an input current Ix (x=1, 2, or 3) of each phase line in real time, and calculate a remaining power supply power and a load power of each phase line.

Specifically, for step 801 to step 805, refer to descriptions of step 501 to step 505 in FIG. 5A and FIG. 5B. To avoid repetition, details are not described herein again.

806: Configure a PSU for each phase line based on the input current Ix of each phase line.

Specifically, currents of three phase lines may be compared. For example, ratios of the currents of the three phase lines are obtained, and the ratios are I1, I2, and I3 respectively. The PSU is configured for each phase line, so that the currents of the three phase lines tend to be balanced. It should be noted that, balancing the currents of the three phase lines is not a purpose, and extracting more power supply capacities from a phase line with a relatively small current is the purpose. In a possible implementation, PSUs may be connected to the three phase lines based on the ratios of the currents of the three phase lines, and a quantity of connected PSUs is in an inverse proportion to the ratios approximately. When the PSUs are not equally distributed, extra PSUs may be arbitrarily and equally distributed on phase lines with a relatively small, sometimes referred to as low, current. In other words, a phase line with a larger current is connected to a smaller quantity of PSUs or is not connected to a PSU. A phase line with a smaller current is connected to a larger quantity of PSUs.

In a possible embodiment, if there are only two PSUs, the two PSUs are respectively connected to two phase lines with a relatively small current.

Alternatively, in another possible implementation, a current output by each PSU may be adjusted based on the ratios of the currents of the three phase lines, so that the currents of the three phase lines are balanced.

As an example rather than a limitation, it may be considered that when a difference between two currents in the currents (I1, I2, and I3) of the three phase lines is less than or equal to 5% of either of the two currents, the currents of the three phase lines are balanced.

807: Determine whether the input current Ix of each phase line is less than or equal to the upper current limit In, that is, Ix≤In.

When it is determined that at least one of the input currents of the three phase lines is greater than the upper current limit In, step 808 is performed. When it is determined that the input currents of the three phase lines each are less than or equal to the upper current limit In, step 809 is performed.

808: Adjust a PSU on a phase line corresponding to Ix, to reduce an input current of the phase line.

When at least one of the input currents of the three phase lines is greater than the upper current limit In, a quantity of rectifiers corresponding to the phase line is adjusted (for example, a quantity of PSUs connected to the phase line is reduced). Alternatively, an output current of the rectifier corresponding to the phase line is adjusted (for example, an output current of the PSU connected to the phase line is reduced). In this way, the input current of the phase line is reduced.

809: Determine whether a total remaining power supply power of the three phase lines is greater than or equal to a load power Pl, that is, P1+P2+P3≥Pl.

810: Charge a lithium battery at a maximum of a power (P1+P2+P3−Pl).

811: Adjust the lithium battery to discharge at a power Pb', so that P1+P2+p3+Pb'=Pl.

For step 809 to step 811, refer to descriptions of step 521 to step 523 in FIG. 5A and FIG. 5B. To avoid repetition, details are not described herein again.

Therefore, in this embodiment of this application, when an input current of a phase line is greater than an input current threshold corresponding to the phase line, a rectifier connected to the phase line is adjusted, so that the input current of the phase line is less than or equal to the input current threshold corresponding to the phase line. Therefore, in this embodiment of this application, power can be supplied to a load by using a power supply capacity gap formed by a communications power that is at an existing network site, to achieve a capacity increase. In addition, in this embodiment of this application, the battery can perform a function of peak clipping and capacity increasing, thereby relieving pressure on a power supply system that needs to be reconstructed due to an insufficient power supply capacity, and reducing reconstruction costs and time.

Figure 9:
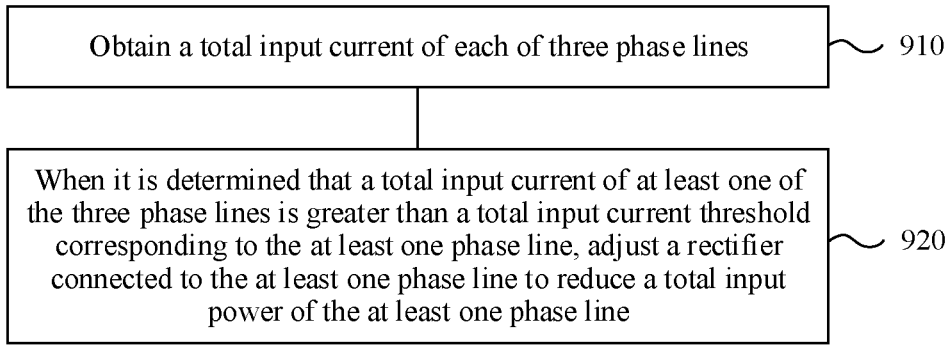
FIG. 9 is a schematic flowchart of another current adjustment method according to an embodiment of this application.

FIG. 9 is a schematic flowchart of a power rectification method according to an embodiment of this application. The method is applied to a first power consumption system, and the first power consumption system includes, for example, a newly-added communications device at an inventory communications site, or includes a communications device at a newly-built communications site. For example, the method may be performed by the controller 110 in the power dynamic capacity increase system 100 shown above.

910: Obtain a total input current of each of three phase lines.

920: When it is determined that a total input current of at least one of the three phase lines is greater than a total input current threshold corresponding to the at least one phase line, adjust a rectifier connected to the at least one phase line to reduce a total input power of the at least one phase line, so that the total input current of the at least one phase line is less than or equal to the total input current threshold corresponding to the at least one phase line.

Therefore, in this embodiment of this application, when a total input current of a phase line is greater than a total input current threshold corresponding to the phase line, a rectifier connected to the phase line is adjusted, so that an input current of the phase line is less than or equal to the total input current threshold corresponding to the at least one phase line. In this case, power output may still be performed on a phase line other than the phase line. Therefore, in this embodiment of this application, power can be supplied to a load by using a power supply capacity gap formed by a communications power that is at an existing network site, to achieve a capacity increase. Therefore, utilization of an input capacity of a power supply system provided in this embodiment of this application is relatively high.

In an optional embodiment, when a total input current of a phase line reaches a corresponding total input current threshold, a rectifier on the phase line stops outputting, to reduce a total input power of the phase line, so that the total input power of the phase line is less than or equal to the total input current threshold. Specifically, refer to step 518, step 519, and step 520 in FIG. 5A and FIG. 5B, and step 808 in FIG. 8.

Optionally, in this embodiment of this application, the method further includes: setting a total input current threshold corresponding to each phase line.

In some possible implementations, the first power consumption system further includes a load and a first battery. The method further includes:

determining a remaining power supply power of each phase line based on the total input current of each phase line; and determining a working state of the first battery based on the remaining power supply power of each phase line and a load power of the load, where the working state of the first battery includes charging by using a current output by the rectifier, or discharging the load.

Specifically, a rectifier on each phase line may be independently adjusted based on the remaining power supply power of each phase line, to implement the working state of the first battery. Therefore, in this embodiment of this application, when a remaining capacity of the power supply system is sufficient, charging management is performed on a battery, and the remaining capacity of the power supply system is stored, to reduce a capacity gap of each phase line. When the remaining capacity of the power supply system is insufficient, discharging management is performed on the battery to release a stored capacity of a battery to compensate for a load requirement. Therefore, in this embodiment of this application, the battery can perform a function of peak clipping and capacity increasing, thereby relieving pressure on the power supply system that needs to be reconstructed due to an insufficient power supply capacity, and reducing reconstruction costs and time.

In some implementations, the determining a working state of the first battery based on the remaining power supply power of each phase line and a load power of the load includes:

if it is determined that the load power is less than or equal to a total remaining power supply power, charging the first battery at a first power, where the first power is less than or equal to a difference between the total remaining power supply power and the load power; or if it is determined that the load power is greater than a total remaining power supply power, discharging the first battery at a second power, where a sum of the second power and the total remaining power supply power is equal to the load power, where the total remaining power supply power is equal to a sum of remaining power supply powers of the three phase lines.

Specifically, the load power is, for example, P1 in FIG. 5A and FIG. 5B or FIG. 8, and the total remaining power supply power is, for example, P1+P2+P3 in FIG. 5A and FIG. 5B or FIG. 8. The first power is, for example, Pb in FIG. 5A and FIG. 5B or FIG. 8, and the second power is, for example, Pb' in FIG. 5A and FIG. 5B or FIG. 8. Specifically, refer to descriptions of step 421, step 422, and step 423 in FIG. 5A and FIG. 5B, or refer to descriptions of step 709, step 710, and step 711 in FIG. 8.

In some implementations, the determining a working state of the first battery based on the remaining power supply power of each phase line and a load power of the load includes:

if it is determined that the remaining power supply power of each of the three phase lines is greater than a third power, adjusting rectifiers on the three phase lines for a current sharing output, and charging the first battery at a real-time charging power of the first battery, where a value of the third power is one third of a sum of the load power and the real-time charging power; and if it is determined that remaining power supply powers of two of the three phase lines each are greater than a fourth power, and a power supply power of the remaining one phase line is less than the third power, enabling rectifiers on the two-phase lines output a current in a current sharing mode, and charging the first battery at the real-time charging power of the first battery, where a value of the fourth power is half of the sum of the load power and the real-time charging power.

Specifically, the third power is, for example, (P1+Pb)/3 in FIG. 5A and FIG. 5B, the fourth power is, for example, P2≥(P1+Pb)/2 in FIG. 5A and FIG. 5B, and the real-time charging power is, for example, Pb in FIG. 5A and FIG. 5B. Specifically, refer to descriptions of step 506 to step 513 in FIG. 5A and FIG. 5B.

Optionally, a quantity of rectifiers connected to each phase line is equal.

Optionally, a relatively large quantity of rectifiers are connected to a phase line in the three phase lines that is with a relatively small current.

Optionally, in this embodiment of this application, after an alternating current power failure, if a value of a voltage provided by the first battery is less than a protection voltage of the first battery, a second battery in a second power consumption system is controlled to discharge for use by the load in the first power consumption system, where a general busbar in the second power consumption system is connected to a general busbar in the first power consumption system by using a direct current converter DC/DC, and the DC/DC isolates the first power consumption system from the second power consumption system during the alternating current power supply.

Therefore, in this embodiment of this application, superposition of the second battery can be implemented. Specifically, when mains power is available, the DC/DC module is controlled to isolate the second battery, to protect an inventory battery. After a mains power failure occurs, the DC/DC module may be controlled to integrate the second battery to provide backup power for a newly-added load, thereby reducing a capacity requirement of the first battery and investment costs.

Figure 10:
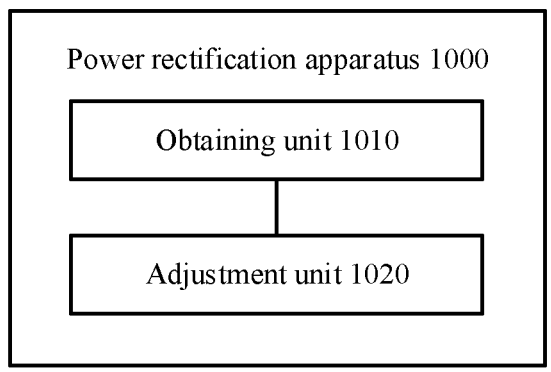
FIG. 10 is a schematic block diagram of a current adjustment apparatus according to an embodiment of this application.

FIG. 10 is a schematic block diagram of a power rectification apparatus according to an embodiment of this application. The power rectification apparatus includes an obtaining unit and an adjustment unit.

The obtaining unit 1010 is configured to obtain a total input current of each of three phase lines.

The adjustment unit 1020 is configured to: when it is determined that a total input current of at least one of the three phase lines is greater than a total input current threshold corresponding to the at least one phase line, adjust a rectifier connected to the at least one phase line to reduce a total input power of the at least one phase line, so that the total input current of the at least one phase line is less than or equal to the total input current threshold corresponding to the at least one phase line.

Therefore, in this embodiment of this application, when a total input current of a phase line is greater than a total input current threshold corresponding to the phase line, a rectifier connected to the phase line is adjusted, so that an input current of the phase line is less than or equal to the total input current threshold corresponding to the at least one phase line. In this case, power output may still be performed on a phase line other than the phase line. Therefore, in this embodiment of this application, power can be supplied to a load by using a power supply capacity gap formed by a communications power that is at an existing network site, to achieve a capacity increase. Therefore, utilization of an input capacity of a power supply system provided in this embodiment of this application is relatively high.

Optionally, the power rectification apparatus further includes a determining unit, configured to:

determine a remaining power supply power of each phase line based on the total input current of each phase line; and determine a working state of the first battery based on the remaining power supply power of each phase line and a load power of the load, where the working state of the first battery includes charging by using a current output by the rectifier, or discharging the load.

Optionally, the determining unit is specifically configured to:

if it is determined that the load power is less than or equal to a total remaining power supply power, charge the first battery at a first power, where the first power is less than or equal to a difference between the total remaining power supply power and the load power; or if it is determined that the load power is greater than a total remaining power supply power, discharge the first battery at a second power, where a sum of the second power and the total remaining power supply power is equal to the load power, where the total remaining power supply power is equal to a sum of remaining power supply powers of the three phase lines.

Optionally, the determining unit is specifically configured to:

if it is determined that the remaining power supply power of each of the three phase lines is greater than a third power, adjust rectifiers on the three phase lines for a current sharing output, and charge the first battery at a real-time charging power of the first battery, where a value of the third power is one third of a sum of the load power and the real-time charging power; and if it is determined that remaining power supply powers of two of the three phase lines each are greater than a fourth power, and a power supply power of the remaining one phase line is less than the third power, enable rectifiers on the two phase lines output a current in a current sharing mode, and charge the first battery at the real-time charging power of the first battery, where a value of the fourth power is half of the sum of the load power and the real-time charging power.

Optionally, a quantity of rectifiers connected to each phase line is equal.

Optionally, a relatively large quantity of rectifiers are connected to a phase line in the three phase lines that is with a relatively small current.

Optionally, the power rectification apparatus further includes a control unit, configured to:

after an alternating current power failure, if a value of a voltage provided by the first battery is less than a protection voltage of the first battery, control a second battery in a second power consumption system to discharge for use by a load in the first power consumption system, where a general busbar in the second power consumption system is connected to a general busbar in the first power consumption system by using a direct current converter DC/DC, and the DC/DC isolates the first power consumption system from the second power consumption system during the alternating current power supply.

Figure 11:
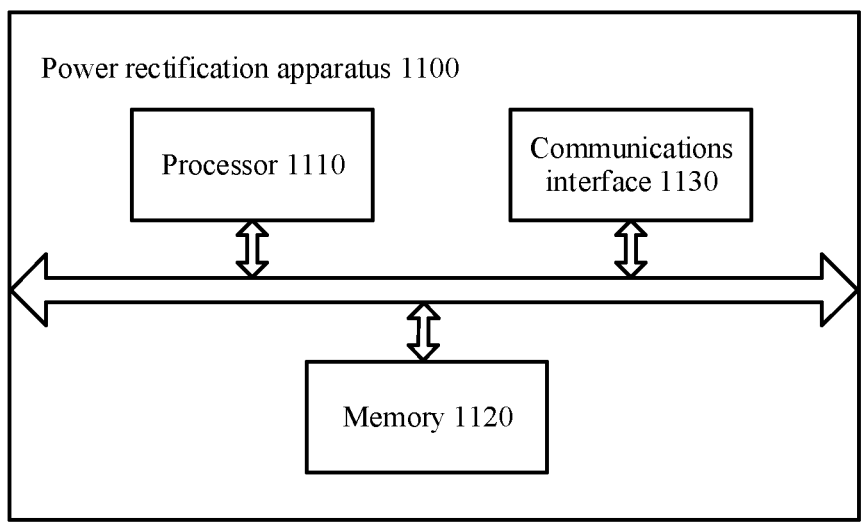
FIG. 11 is a schematic block diagram of another current adjustment apparatus according to an embodiment of this application.

It should be noted that in this embodiment of this application, the obtaining unit 1010 may be implemented by using a communications interface, and the adjustment unit 1020 may be implemented by using a processor. Optionally, the determining unit may be implemented by using the processor. As shown in FIG. 11, a power rectification apparatus 1100 may include a processor 1110, a memory 1120, and a communications interface 1130. The memory 1120 may be configured to store code executed by the processor 1110, and the like. The processor 1110 may be configured to process data or a program.

In an implementation process, steps in the foregoing methods can be implemented by using a hardware integrated logical circuit in the processor 1110, or by using instructions in a form of software. The steps of the method disclosed with reference to the embodiments of the present invention may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, or a register. The storage medium is located in the memory 1120, and a processor 1110 reads information in the memory 1120 and completes the steps in the foregoing methods in combination with hardware of the processor. To avoid repetition, details are not described herein again.

The apparatus 1000 shown in FIG. 10 or the apparatus 1100 shown in FIG. 11 can implement processes of the power rectification method corresponding to the foregoing method embodiments. Specifically, for the apparatus 1000 or the apparatus 1100, refer to the foregoing descriptions. To avoid repetition, details are not described herein again.

An embodiment of this application further provides a computer-readable medium, configured to store a computer program, and the computer program includes instructions used to perform a corresponding method in the foregoing method embodiments.

An embodiment of this application further provides a computer program product. The computer program product includes computer program code. When the computer program runs on behalf of a processor of a Bluetooth test apparatus, the packet fragmentation avoidance apparatus is enabled to perform a corresponding method in any one of the foregoing method embodiments.

The embodiments in this application may be used independently, or may be used jointly. This is not limited herein.

It should be understood that the descriptions of "first", "second", and the like in the embodiments of this application are merely used to illustrate and distinguish description objects, and there is no sequence. The descriptions of "first", "second", and the like do not represent a special limitation on a quantity of devices in the embodiments of this application, and cannot constitute any limitation on the embodiments of this application.

It should be further understood that sequence numbers of the foregoing processes do not mean execution sequences in the embodiments of this application. The execution sequences of the processes should be determined based on functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, division into units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate. Parts displayed as units may or may not be physical units, to be specific, may be located in one position, or may be distributed on a plurality of network units. Some or all of the units may be selected based on an actual requirement to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the current technology, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A power rectification method, wherein the method is applied to a first power consumption system, and the method comprises:
    obtaining a total input current of at least three phase lines;
    determining that a total input current of at least one of the three phase lines is greater than a total input current threshold corresponding to the at least one phase line; and
    adjusting a rectifier connected to the at least one phase line to reduce a total input power of the at least one phase line, so that the total input current of the at least one phase line is less than or equal to the total input current threshold corresponding to the at least one phase line.

2. The method according to claim 1, wherein the method further comprises:
    determining a remaining power supply power of each of the at least three phase lines based on the total input current of each phase line; and
    determining a working state of a first battery based on the remaining power supply power of each phase line and a load power of a load, wherein the working state of the first battery comprises charging by using a current output by the rectifier, or discharging the load.

3. The method according to claim 2, wherein the determining a working state of the first battery based on the remaining power supply power of each phase line and a load power of the load comprises:
    determining that the load power is less than or equal to a total remaining power supply power, charging the first battery at a first power, wherein the first power is less than or equal to a difference between the total remaining power supply power and the load power or
    that the load power is greater than a total remaining power supply power, discharging the first battery at a second power, wherein a sum of the second power and the total remaining power supply power is equal to the load power, wherein the total remaining power supply power is equal to a sum of remaining power supply powers of the three phase lines.

4. The method according to claim 2, wherein the determining a working state of the first battery based on the remaining power supply power of each phase line and a load power of the load comprises
    determining that the remaining power supply power of each of the three phase lines is greater than a third power, adjusting rectifiers on the three phase lines for a current sharing output, and charging the first battery at a real-time charging power of the first battery, wherein a value of the third power is one third of a sum of the load power and the real-time charging power.

5. The method according to claim 1, wherein a quantity of rectifiers connected to each phase line is approximately equal.

6. The method according to claim 1, wherein a plurality of rectifiers are connected to a phase line in the three phase lines that is with a relatively low current.

7. The method according to claim 1, further comprising:
    after an alternating current power failure, if a value of a voltage provided by the first battery is less than a protection voltage of the first battery, controlling a second battery in a second power consumption system to discharge for use by the load in the first power consumption system, wherein a general busbar in the second power consumption system is connected to a general busbar in the first power consumption system by using a direct current converter DC/DC, and the DC/DC isolates the first power consumption system from the second power consumption system during the alternating current power supply.

8. An apparatus, comprising:
at least one processor; and
a memory coupled to the at least one processor and having program instructions stored thereon which, when executed by the at least one processor, cause the apparatus to:
obtain a total input current of at least three phase lines, determine that a total input current of at least one of the at least three phase lines is greater than a total input current threshold corresponding to the at least one phase line, and adjust a rectifier connected to the at least one phase line to reduce a total input power of the at least one phase line, so that the total input current of the at least one phase line is less than or equal to the total input current threshold corresponding to the at least one phase line.

9. The apparatus according to claim 8, wherein the program instructions which, when executed by the at least one processor, cause the apparatus to:
determine a remaining power supply power of each phase line based on the total input current of each phase line; and
determine a working state of the first battery based on the remaining power supply power of each phase line and a load power of the load, wherein the working state of the first battery comprises charging by using a current output by the rectifier, or discharging the load.

10. The apparatus according to claim 9, wherein the program instructions which, when executed by the at least one processor, cause the apparatus to:
determine that the load power is less than or equal to a total remaining power supply power, charge the first battery at a first power, wherein the first power is less than or equal to a difference between the total remaining power supply power and the load power or
determine that the load power is greater than a total remaining power supply power, discharge the first battery at a second power, wherein a sum of the second power and the total remaining power supply power is equal to the load power, wherein the total remaining power supply power is equal to a sum of remaining power supply powers of the three phase lines.

11. The apparatus according to claim 9, wherein the program instructions which, when executed by the at least one processor, cause the apparatus to:
determine that the remaining power supply power of each of the three phase lines is greater than a third power, adjust rectifiers on the three phase lines for a current sharing output, and charge the first battery at a real-time charging power of the first battery, wherein a value of the third power is one third of a sum of the load power and the real-time charging power.

12. The apparatus according to claim 8, wherein a quantity of rectifiers connected to each phase line is approximately equal.

13. The apparatus according to claim 8, wherein a plurality of rectifiers are connected to a phase line in the three phase lines that is with a relatively low current.

14. The apparatus according to claim 8, the program instructions which, when executed by the at least one processor, cause the apparatus to:
after an alternating current power failure, if a value of a voltage provided by the first battery is less than a protection voltage of the first battery, control a second battery in a second power consumption system to discharge for use by the load in a first power consumption system, wherein a general busbar in the second power consumption system is connected to a general busbar in the first power consumption system by using a direct current converter DC/DC, and the DC/DC isolates the first power consumption system from the second power consumption system during the alternating current power supply.

15. A non-transitory computer-readable storage medium coupled to the at least one processor and storing programming instructions for execution by the at least one processor, wherein the programming instructions cause an apparatus to:
obtain a total input current of each of three phase lines, determine
that a total input current of at least one of the three phase lines is greater than a total input current threshold corresponding to the at least one phase line, and adjust a rectifier connected to the at least one phase line to reduce a total input power of the at least one phase line, so that the total input current of the at least one phase line is less than or equal to the total input current threshold corresponding to the at least one phase line.

16. The non-transitory computer-readable storage medium according to claim 15, wherein the program instructions which, when executed by the at least one processor, cause the apparatus to:
determine a remaining power supply power of each phase line based on the total input current of each phase line; and
determine a working state of the first battery based on the remaining power supply power of each phase line and a load power of the load, wherein the working state of the first battery comprises charging by using a current output by the rectifier, or discharging the load.

17. The non-transitory computer-readable storage medium according to claim 16, wherein the program instructions which, when executed by the at least one processor, cause the apparatus to:
if it is determined that the load power is less than or equal to a total remaining power supply power, charge the first battery at a first power, wherein the first power is less than or equal to a difference between the total remaining power supply power and the load power; or
if it is determined that the load power is greater than a total remaining power supply power, discharge the first battery at a second power, wherein a sum of the second power and the total remaining power supply power is equal to the load power, wherein
the total remaining power supply power is equal to a sum of remaining power supply powers of the three phase lines.

18. The non-transitory computer-readable storage medium according to claim 16, wherein the program instructions which, when executed by the at least one processor, cause the apparatus to:
if it is determined that the remaining power supply power of each of the three phase lines is greater than a third power, adjust rectifiers on the three phase lines for a current sharing output, and charge the first battery at a real-time charging power of the first battery, wherein a value of the third power is one third of a sum of the load power and the real-time charging power; and
if it is determined that remaining power supply powers of two of the three phase lines each are greater than a fourth power, and the power supply power of the remaining one phase line is less than the third power, enable rectifiers on the two phase lines output a current in a current sharing mode, and charge the first battery at the real-time charging power of the first battery, wherein a value of the fourth power is half of the sum of the load power and the real-time charging power.

19. The non-transitory computer-readable storage medium according to claim 15, wherein a quantity of rectifiers connected to each phase line is approximately equal.

20. The non-transitory computer-readable storage medium according claim 15, wherein a plurality of rectifiers are connected to a phase line in the three phase lines that is with a low current.

* * * * *